United States Patent [19]

Bianchi et al.

[11] 4,354,774

[45] Oct. 19, 1982

[54] METHOD AND APPARATUS FOR THE RESTRAINED AND FLAME-RETARDANT LAYING OF ELECTRIC CABLES

[75] Inventors: Giuseppe Bianchi, Milan; Giovanni Gussoni, Settimo Milanese, both of Italy

[73] Assignee: Industrie Pirelli Societa per Azioni, Milan, Italy

[21] Appl. No.: 161,581

[22] Filed: Jun. 20, 1980

[30] Foreign Application Priority Data

Jun. 29, 1979 [IT] Italy ............................ 23966 A/79

[51] Int. Cl.³ ............................................. F16L 1/00
[52] U.S. Cl. ................................. 405/157; 405/154
[58] Field of Search ............................ 405/154–157, 405/152, 172

[56] References Cited

U.S. PATENT DOCUMENTS

| | | | |
|---|---|---|---|
| 1,923,006 | 8/1933 | Proctor | 405/152 |
| 2,355,966 | 8/1944 | Goff | 405/157 |
| 2,773,512 | 12/1956 | Burk | 405/157 X |
| 2,862,367 | 12/1958 | Silverstein et al. | 405/157 |
| 2,972,968 | 2/1961 | Stafford | 405/157 X |
| 3,427,812 | 2/1969 | Hollander | 405/172 |
| 3,582,533 | 6/1971 | Albright | 405/157 |
| 3,675,432 | 7/1972 | Keene | 405/157 |

Primary Examiner—Dennis L. Taylor
Attorney, Agent, or Firm—Brooks, Haidt, Haffner & Delahunty

[57] ABSTRACT

System and method for the restrained and flame-retardant laying of one or more electric cables in a duct with a flat bottom. The ductway comprises a series of rigid and non-flammable elongated elements, each with a U-shape cross section, which are individually anchored to a flat floor and are arranged so that there is a space between contiguous elements. This space is sealed along its outer perimeter with a flexible and non-flammable material thereby forming a longitudinally sealed duct. One or more electric cables are laid inside the duct and the cable ends are fastened in fixed positions. The duct is filled with sandy materials and is completed with a slab attached to the top of each elongated element and arranged so that there is a space between contiguous slabs. This latter space is sealed along its outer perimeter with a flexible and non-flammable material. The duct and the sandy materials constitute protection against fire. The spaces between contiguous elongated elements and between corresponding contiguous slabs serve to avoid the harmful effects of forces, generated both inside and outside of the duct, due to variation of cable working temperature and to settling.

9 Claims, 2 Drawing Figures

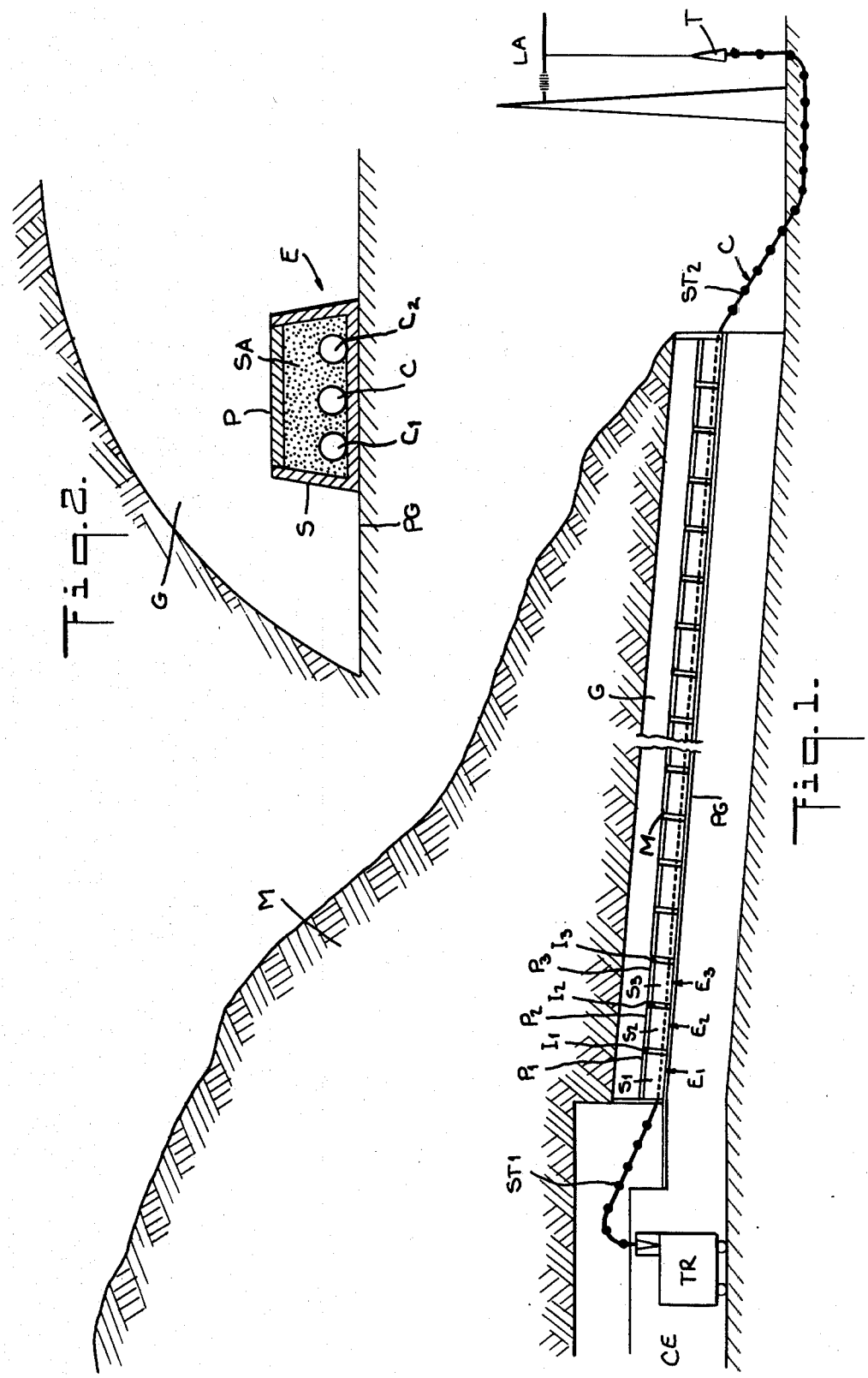

METHOD AND APPARATUS FOR THE RESTRAINED AND FLAME-RETARDANT LAYING OF ELECTRIC CABLES

The present invention relates to methods and apparatus for the restrained and flame-retardant laying of electric cables.

More particularly, the present invention relates to methods and apparatus for laying electric cables in which the flame-retardent protection is obtained by arranging the cables inside a duct of rigid and non-flammable material and in which the restraining is obtained by anchoring the duct to a flat bottom and filling said duct with sandy materials.

It is known to those skilled in the art that the expression "restrained laying" refers to the laying of a cable in such way as will prevent any change in the length of the cable between its ends due to thermal variations.

One situation in which the present invention is particularly advantageous is where electric power cables for transmitting power at voltages on the order of 200–400 kV must be laid inside a tunnel (which can extend for several hundred meters) for connecting the transformers of a hydroelectric generating-station placed in a cavern with the sealing ends from which the overhead line start-off. In the following description the reference will be made mainly to this situation. However, it will be apparent that the present invention may be found to be advantageous in all those cases where a restrained and/or flame-retardant laying is required.

It is known that one of the major problems with the arrangement of electric cables in long and narrow places (underground passages, tunnels, etc.) is that of preventing fires in such places or preventing the actual propagation within such places of flames occurring elsewhere. Power plants and the like could rapidly be destroyed because of flames developing in these hard to reach places. In order to avoid this risk, the cables can be arranged within suitable elongated containers of non-flammable material.

In the case of power cables, the presence of the container makes it very difficult to lay the cables with application of clamping means secured to fixed structures according to the known "restrained laying" or "waved laying" techniques. On the other hand, the restrained or waved laying operation is essential for the laying of power cables because of the great thermal variations that are produced as a consequence of varying the transmitted power. Since the cable cannot be clamped in this situation, it is possible to apply another known technique for the "restrained laying," said known technique consisting of the arrangement of compressed layers of sandy materials around the cable. This latter technique can be applied to the case in which the cables are placed in a container having fire-protective functions, provided that the container has sufficiently rigid and strong walls and is anchored to the ground.

In practice, the following solution is therefore adopted.

A fixed structure comprising a duct of concrete with a generally U-shaped cross section is arranged along the tunnel. Said duct is generally formed in place as a concrete casting, either in a seat excavated in the floor of the tunnel or on the floor itself. In any event, the duct so obtained is anchored to the ground, at least through the action of its own weight and of the materials contained therein. The electric cables are laid on the bottom of the duct, and the ends of the cables projecting from the extremities of the duct are secured to fixed supports by a clamping means. The duct is filled with sandy materials according to known techniques and is completed with a concrete covering placed over the uppermost part of the duct. Said covering can be either cast in place or applied as a pre-fabricated slab. Of course, said open duct can be formed by placing on the bottom a plurality of pre-fabricated elements instead of a unitary concrete duct cast in place. However, said elements are placed into contact with each other and are rigidly joined to one another. Therefore, in this case, the duct is constituted, practically, by a single rigid block anchored to the bottom.

By operating according to the known techniques, a somewhat satisfactory restrained and non-flammable laying is obtained. In fact, on one hand, the duct is anchored to the floor of the tunnel, and therefore, it does not elongate. On the other hand, the sand exerts against the walls of the cables friction sufficient to withstand the variations in length of the cables themselves. Moreover, as is obvious, the duct and the sand constitute a valid form of protection against fire and flames.

However, this last-described laying system has a drawback which cannot be disregarded. It is easily understandable that the duct is subjected to mechanical stresses generated inside and outside of the duct. The inner stresses are caused by the longitudinal forces developing in the cables due to the variations in the working temperature. The outer stresses are caused by the settling forces of the bearing surface for the duct, i.e. the floor of the tunnel or other bearing structures. These last-mentioned stresses are quite unforeseeable, both with respect to their application zone and with respect to their magnitude and their effects, and therefore, it is not easy to take these forces into account in planning and installing the duct.

Both the forces generated inside and the forces generated outside of the duct tend to concentrate their action at certain points of the duct, for example, at the zones where there is the rigid connection. It follows that the duct itself can undergo, in a more or less long time, deformations, cracks and failures, with a consequent hazard to the cables contained therein and to the safety of the whole plant.

The present invention has, as one object, the avoidance of said drawbacks and at the same time to assure a suitable clamping of the cables, as well as good protection of the cables themselves against fire. In accordance with such object, there is provided methods and apparatus for the restrained and flame-retardant laying of one or more electric cables on a surface, the apparatus comprising a duct of a rigid and non-flammable material, arranged around said electric cable or cables, anchored to said surface and filled with sandy materials, said duct comprising a plurality of elongated elements individually anchored to said surface and spaced from one another and comprising a flexible and non-flammable material for sealing the space between the elements along the outer perimeter of the space.

A further object of the present invention is a method for preparing an installation for a restrained and flame-retardant laying of cables comprising the following steps:

arranging on a flat surface a series of supports which have a U-shaped cross section and which are individually anchored to said flat bottom, said supports being aligned and appropriately separated from one another so as to provide a space between the ends of contiguous supports;

sealing the outer perimeters of the spaces provided between the ends of said U-shaped supports with a flexible and non-flammable material for forming a duct;

laying within said duct one or more electric cables and securing the ends of said cables to fixed structures through clamping means;

covering the one or more electric cables with sandy materials;

applying and securing a slab of rigid and non-flammable material on each one of said U-shaped supports, said slab completely covering the uppermost portion of said support and being arranged so as to provide a space between the ends of contiguous slabs;

sealing the outer perimeter of said space provided between the ends of contiguous slabs with a flexible and non-flammable material.

Other objects and advantages of the present invention will be apparent from the following detailed description of the presently preferred embodiments thereof, which description should be considered in conjunction with the accompanying drawings in which:

FIG. 1 illustrates schematically a restrained and flame-retardant cable installation in a tunnel extending from the zone in which there are transformers of a hydroelectric generating-station in a cavern and the zone in which there are sealing ends from which overhead lines start off; and FIG. 2: an enlarged cross-sectional view of a preferred embodiment of the installation.

FIG. 1 shows a cable C extending between the transformer TR of the generating-station CE and the sealing end T, from which the overhead line LA starts off. Although the laying of only one cable C will be described, other cables, such as the cables C1 and C2 (FIG. 2) may be similarly layed.

The cable C passes through the tunnel G formed in the mountain M. On the floor PG of tunnel G (in practice, a flat bottom) there are the elongated elements E1, E2, E3, etc. separated from one another by the spaces I1, I2, I3, etc. Each of said elongated elements E1, E2, E3, etc., is comprised of support S1, S2, S3, etc., having a U-shaped cross section, and a slab P1, P2, P3, etc. which completely covers the uppermost portion of its corresponding support S1, S2, S3, etc. and is secured to the same.

Both the support S1, S2, S3, etc., having a U-shaped cross section, and the slab P1, P2, P3, etc. are constructed of a rigid and non-flammable material. In this specific case, the slab P1, P2, P3, etc. are preferably made of concrete.

The elongated elements E1, E2, E3, etc. must be suitably anchored to the floor PG. In the case where the elongated elements E1, E2, E3, etc. are constructed of concrete, their own weight and the weight of the materials contained therein constitute a sufficient anchoring means.

The elongated elements E1, E2, E3, etc. are aligned with one another to form a duct. Between said elements, there are spaces I1, I2, I3, etc. each of which is small with respect to the length of an elongated element E1, E2, E3, etc. The elongated elements form a duct comprising individual elements spaced from and contiguous to other elements and movable, as may be required, with respect to each other. The projecting ends of the cable C are secured to fixed sructures by clamping means ST1 and ST2.

The duct is filled with sandy materials according to known techniques. The empty spaces I1, I2, I3, etc. are sealed along the outer perimeter with a flexible and non-flammable material M; preferably, in this case, the sealant may be silicone mastics or gummed-tape, each containing appropriate quantities of flame-retardant additives.

The sequence of the operations for restrained and flame-retardant laying according to the present invention is as follows: aligning and anchoring the supports having a U-shaped cross section in such a way so as to provide a space between each support (said supports can be made in place or can be pre-fabricated and thereafter placed inside the tunnel); sealing the spaces between said supports; laying the cable and clamping its ends; covering the cable with sandy materials; applying and securing a slab on each one of said supports and sealing the spaces between contiguous slabs.

FIG. 2 shows an elongated element E, which, according to a preferred embodiment of the present invention, has the cross-sectional shape of an isosceles trapezoid. The elongated element E consists of a support S having a flat base and two sides inclined inwardly in the upward direction, and a slab P applied to the uppermost free ends and inside of said sides of said support S. In the situation where said support S is made of concrete, application of said slab P can be accomplished through a concrete casting formed in place. Said elongated element E, shown with three cables C, C1, and C2, is filled with sandy materials SA which permit subsequent settling of the elongated element E without affecting the cables.

The characteristics of an elongated element (material, length, thickness of the walls, etc.) and of the duct (distance between contiguous elongated elements, flexible and non-flammable sealing materials, etc.) can change to take into account the characteristics of the cables (dimensions, powers transmitted, coefficient of expansion, etc.) and of the zone where said restrained and flame-retardant laying must be prepared. For example, where the elongated elements are of concrete and the cable voltage ranges from 200–400 kV, it is convenient that each of the elongated elements has a length of about 1 meter if the cables are provided with an aluminum protective sheath and has a length of about 0.5 meter if the cables are provided with a lead protective sheath. The space between contiguous elongated elements is about 1 cm. in either situation.

From that which is disclosed above, it is apparent that the advantages of a restrained and flame-retardant laying according to the present invention derive from the use of a ductway comprised of a series of rigid and non-flammable elements as opposed to a single rigid element, apart from one another and individually anchored to the floor, thereby rendering each element independent from the others. The space provided between contiguous elongated elements permits small movements or deformations of each elongated element without causing damage to the duct. The flexible and non-flammable material, covering the outer perimeter of the space provided between contiguous elongated elements, prevents the escape of sandy materials thereby insuring that the cables within the ductway remain covered and therefore not subject to attack from open flames from without. This arrangement is not prejudicial to the independence of any one elongated element with respect to contiguous elongated elements.

The system representing the present invention permits the laying of cables in such a way so as to satisfy not only the required conditions of rigidity and non-flammability, but also to minimize the risk of serious damage to the duct and to the cables that would result from the mechanical stresses generated both inside and outside of said ductway. In addition, the sub-division of the duct into a series of elements, produces, as is easily understood, a significant improvement in the ease of preparation of the duct itself.

Although preferred embodiments of the present invention have been described and illustrated, it will be apparent to those skilled in the art that various modifications may be made without departing from the principles of the invention.

What is claimed is:

1. Apparatus for the restrained and flame-retardant laying of one or more electric cables on a surface, said apparatus comprising a duct formed by a plurality of elongated duct elements disposed in alignment with each other and having a cross-section such that they extend at least part way around said one or more cables, said elements being rigid and being made of a non-flammable material and each element being small in length in relation to the length of said duct and comprising a first part which is U-shaped in cross-section and a second portion in the form of a cap which covers the open side of said first part, said elements being spaced from each other at their ends by an amount which is small in relation to their lengths to permit longitudinal movement of the ends of the first part and second part of one element with respect to the first part and the second part of the next adjacent element and said elements being mounted with respect to said surface so as to resist movement in relation to said surface, a granular, non-flammable material in said duct and covering said one or more cables and a flexible, non-flammable sealing means extending between adjacent ends of the parts of said elements for sealing the spaces between said adjacent ends while permitting movement of the ends with respect to each other whereby said one or more cables in said duct are restrained within said duct and said elements can move with respect to each other if required.

2. Apparatus as set forth in claim 1 wherein said granular, non-flammable material is sand and wherein said one or more cables extends from opposite ends of said duct and further comprising means at the opposite ends of said duct clamping the portions of said one or more cables extending from the opposite ends of the duct in fixed positions.

3. Apparatus as set forth in claim 1 or 2 wherein said first part of each element having a U-shaped cross-section has a flat base and two sides inclined inwardly in the direction from the base toward its open side.

4. Apparatus as set forth in claim 1 or 2 wherein the space within the duct is filled with sand.

5. Apparatus as set forth in claim 1 or 2 wherein said sealing means is silicone mastics containing flame-retardant additives and extending between the adjacent spaced ends of said elements.

6. Apparatus as set forth in claim 1 or 2 wherein said sealing means is a gummed tape containing flame-retardant additives and adhesively secured to adjacent ends of said elements.

7. Apparatus as set forth in claim 1 or 2 wherein said sealing means is a silicone mastics containing flame-retardant additives and engaging adjacent ends of said elements.

8. A method for the restrained and flame-retardant installation of one or more electric cables, said method comprising:

arranging a plurality of supports having a U-shaped cross-section in a movement resistant relation to a surface, said supports being arranged in alignment with each other but with spaces between their ends which are small relative to the lengths of the supports to permit longitudinal movement of the ends with respect to each other and said supports being made of a rigid, non-flammable material and being mounted with their open sides facing away from said surface;

sealing the spaces between the ends of adjacent supports with a flexible, non-flammable sealing means to permit movement of the ends with respect to each other;

laying one or more electric cables within said duct and securing the ends of said one or more cables to fixed structures;

covering said one or more electric cables with a granular, non-flammable material;

covering the open sides of each of said supports with a slab of rigid, non-flammable material, each slab being secured to said support and being spaced at its ends from an adjacent slab by an amount which is small relative to the length of a slab; and sealing the spaces between the ends of adjacent slabs with a flexible, non-flammable sealing means to permit movement of the ends of the slabs with respect to each other.

9. Method as set forth in claim 8 wherein the covering of the open sides of the supports with a slab is accomplished through a concrete casting formed in place.

* * * * *